United States Patent [19]

Hashemzadeh

[11] Patent Number: 5,895,795
[45] Date of Patent: Apr. 20, 1999

[54] COMPOSITION CONTAINING FINE SOLID PARTICLES

[75] Inventor: Abdulmajid Hashemzadeh, Elsenfeld, Germany

[73] Assignee: Akzo Nobel NV, Arnhem, Netherlands

[21] Appl. No.: 08/894,946

[22] PCT Filed: Feb. 26, 1996

[86] PCT No.: PCT/EP96/00782

§ 371 Date: Sep. 23, 1997

§ 102(e) Date: Sep. 23, 1997

[87] PCT Pub. No.: WO96/27638

PCT Pub. Date: Sep. 12, 1996

[30] Foreign Application Priority Data

Mar. 4, 1995 [DE] Germany ................ 195 07 589

[51] Int. Cl.$^6$ ............................................. C08L 1/00
[52] U.S. Cl. ............... 524/35; 106/166.42; 106/200.3
[58] Field of Search ................. 106/166.42, 200.3; 523/200; 524/35

[56] References Cited

U.S. PATENT DOCUMENTS 5,656,224  8/1997  Zikeli ............................ 264/207
5,679,146  10/1997  Kalt ............................. 106/166.01

FOREIGN PATENT DOCUMENTS

| 850910 A1 | 9/1970 | Canada. |
| 930 724 | 7/1973 | Canada. |
| 0 047 929 A2 | 3/1982 | European Pat. Off.. |
| 0 553 070 A1 | 7/1993 | European Pat. Off.. |
| 41 06 029 A1 | 11/1991 | Germany. |

OTHER PUBLICATIONS

Uspatfull 94:106028 (U.S. Patent No. 5370322).
Derwent Abstract 94–235355.
Caplus–Abstract 1967:444767.
Marianne Marx-Figini, Die Angewandte Makromolekulare Chemie 72 (1978), pp. 161–171, "Significance of the Intrinsic Viscosity Ratio of Unsubstituted and Nitrated Cellulose in Different Solvents".

*Primary Examiner*—Paul R. Michl
*Attorney, Agent, or Firm*—Oliff & Berridge, PLC

[57] ABSTRACT

A composition is described containing fine solid particles held in an encapsulation or dispersed in a matrix and which are inert towards the encapsulation or the matrix, whereby the encapsulation or the matrix consists of a homogeneous mixture of cellulose, tertiary amine oxide, water and, if necessary, other components. The compositions are suited for matting, pigmenting etc. of cellulose filaments, films and membranes.

26 Claims, No Drawings

COMPOSITION CONTAINING FINE SOLID PARTICLES

BACKGROUND OF THE INVENTION

The invention relates to a composition containing fine solid particles such as inorganic and organic pigments, synthetic polymers and the like, all of them held in an encapsulation or dispersed in a matrix whereby the encapsulation or the matrix consists of a homogeneous mixture of cellulose, tertiary amine oxide, water and, if necessary, other components.

Dispersions of solid particles such as pigments are needed for a wide variety of applications. A significant application is for example the mat-finishing of cellulose filaments.

It is practically impossible to distribute solid particles such as pigments, e.g., titanium dioxide, directly and uniformly into a spin mass. This applies also to the manufacturing of cellulose filaments according to the so-called NMMO process, a process whereby cellulose is dissolved in a mixture of N-methylmorpholine-N-oxide, water and, if necessary, additional components and is further processed into filaments by a method known per se. However, attempts to directly stir the pigments into the spin mass result in agglomerations. Therefore spinning disturbances are automatically programmed in. In addition uniformity of the filaments obtained suffers.

For this reason, a preventive measure is taken that results in the production of appropriate suspensions or pastes, i.e., masses containing a considerable portion of the pigment or other solid particles to be distributed, and the spin mass is doped with these pastes or suspensions.

A disadvantage of this process in the prior art is that on the one hand it is very laborious to manufacture such pastes and suspensions, and that even with extensive kneading and stirring the agglomerations of the solid particles cannot be fully destroyed, therefore making it necessary to filter the suspensions once again. On the other hand these processes use emulsifiers or stabilizers, which firstly should ensure a better distribution of the particles in the paste or suspension and secondly should improve the stability of the suspensions or pastes. Despite all of these efforts, signs of separation, sedimentation or reagglomeration continue to appear during storage so that the paste or suspension is no longer homogeneous, possibly leading to irregularities in the manufacturing.

Additionally, during the washing of the filaments, films and the like, which were manufactured using such pastes or suspensions, the emulsifiers and other additives are mostly washed out therefore further polluting the washwater so that additional problems occur during the reprocessing of the washwater and the solvent, especially the NMMO.

For this reason there is still a need for fine, dispersed or dispersible solid particles which do not possess the aforementioned disadvantages, can easily be manufactured, and can furthermore be employed in various applications.

SUMMARY OF THE INVENTION

The object of the invention is therefore to make compositions available containing fine, dispersed or dispersible solid particles which are stable, do not have a tendency to separate, can be easily distributed in cellulosic compositions, are easy to manufacture, can be variously utilized, and during further processing of formed objects, e.g., during washing of cellulosic filaments, do not give rise to problems as a result of washing out emulsifiers and the like when the washwater and the solvent are reprocessed. These should be compositions which also comply satisfactorily with the strict environmental protection requirements.

This objective is met by a composition containing fine solid particles held in an encapsulation or dispersed in a matrix and which are inert towards the encapsulation or matrix, whereby the encapsulation or the matrix consists of a homogeneous mixture of cellulose, tertiary amine oxide, water and, if necessary, additional components; and the composition consists of 0.5 to 10 percent cellulose by weight, 5 to 76 percent solid particles by weight and the balance up to 100% of a mixture of tertiary amine oxide, water and, if necessary, additional components. The tertiary amine oxide is preferably N-methylmorpholine-N-oxide.

DETAILED DESCRIPTION OF PREFERRED EMBODIMENTS

It is advantageous if the composition consists of 40 to 50 percent solid particles by weight, 1 to 2 percent cellulose by weight (in relation to solid particles), 59 to 48 percent by weight of a mixture of tertiary amine oxide and water and, if necessary, additional components. Preferably the cellulose possesses a DP (mean degree of polymerization) of 500 to 700.

The weight ratio in the composition between tertiary amine oxide and water is preferably 75–90:25–10. The solid particles can be of an inorganic or organic nature.

In a further advantageous embodiment of the invention the organic solid particles consist of synthetic polymers. Preferably the compositions contain inorganic or organic pigments, particularly titanium oxide or barium sulfate.

At room temperature the compositions are preferably solid. In a further embodiment of the invention the compositions can also be liquid.

The composition can also be present as solid discrete particles. The discrete particles can either have a powdery, granulated or spherical form.

A further subject of the invention is a process for the production of compositions containing fine solid particles which are inert towards the encapsulation or the matrix, a process which is characterized in that solid particles are distributed in a solution of cellulose, tertiary amine oxide, water and, if necessary, other components, and the dispersion obtained is, if necessary, cooled down and crushed or excess solution is drained off the obtained dispersion and the resulting dispersion is, if necessary, cooled down and crushed, whereby the composition is produced using 0.5 to 10 percent cellulose by weight, 5 to 76 percent solid particles by weight and the balance up to 100% of a mixture of tertiary amine oxide, water and, if necessary, additional components. It is advantageous if high shear forces are used to distribute the solid particles.

Preferably the distribution of the solid particles is carried out in a solution with a viscosity of 5.0 to 100 mPa s, whereby the viscosity is measured at 90° C. The liquid, fine-particled dispersion is preferably cast in molds, cooled down and crushed.

In a further advantageous embodiment of the process of the invention solid particles are formed from the liquid dispersion by spraying.

The compositions of the invention are advantageously used for pigmentation, matting of cellulose filaments, films and membranes as well as for the manufacture of cellulose filaments, films and membranes which remain stable when exposed to ultraviolet radiation.

Inert towards the encapsulation or the matrix means that the solid particles which are employed for forming the composition do not decompose the encapsulation or the matrix under processing conditions. Copper oxide, ferrous oxide and ferric oxide count among non-inert compounds which, if heated with the amine oxide, lead to severe decomposition of N-methylmorpholine-N-oxide. Within the framework of the invention titanium dioxide, barium sulfate, sodium carbonate, carbon black and others are classified as inert inorganic compounds. Inert organic compounds are polymer powders such as PVC, polystyrene, and thermoplastic starch among others.

Additionally flame retardant substances as for example phosphorus and nitrogen compounds, silicates or porous particles, which can subsequently be loaded with active ingredients such as fragrances, insect repellents or the like, can be intermingled as inert particles.

Additional components which could be present in the composition are mainly stabilizers such as gallic acid propyl ester, gallic acid, pyrogallol, ascorbic acid or dispersion auxiliaries (as for instance emulsifiers).

The process of the invention can for instance be carried out as follows. First, a solution is produced containing cellulose, the amine oxide, particularly N-methylmorpholine-N-oxide, as well as an appropriate amount of water and, if necessary, other additives such as stabilizers, e.g., gallic acid propyl ester. The solution must contain a sufficient amount of cellulose so that the solid particles during dispersion exhibit at least a monomolecular layer of cellulose on the entire surface. It is advantageous that each dispersed particle is encapsulated by a layer several molecules thick. It is very advantageous if the amount of solution is measured so that the dispersed particles are embedded as in a matrix and that the distance between the individual solid particles in the matrix is relatively large, e.g., at least the diameter of one particle.

Hereby the amounts of cellulose in relation to the dispersed particles can be varied in relatively wide ranges, i.e., the process can still be conducted when a considerable excess of cellulose exists. When working with an excess, the solid particles are first suspended in the solution. After solidification of the mix the finely dispersed particles are as if embedded in a matrix.

Matrix at room temperature means a solid mass which shows in its essence a uniform cohesive structure in which the solid particles, such as pigments in plastics, are finely dispersed. At elevated temperatures (e.g., >9° C.) the matrix melts into a concentrated paste, whereby no flocculation of the particles takes place.

Theoretically, the minimum amount which is necessary can be calculated from the specific surface area of the solid particles, e.g., the pigments, and the hydrodynamic volume of the cellulose in the solution. In practice, however, a trial takes place first in which an excess of cellulose solution is prepared and the liquid dispersion is then subjected to an ultrafiltration during which only the solution passes through and the particles encapsulated by a monomolecular layer are retained. The minimum amount necessary can be calculated from the difference between the predetermined amount and the amount drained off through ultrafiltration.

Solutions with amounts of 1 to 2 percent cellulose by weight in relation to the dispersed solid particles have proven to be very advantageous.

For the production of the solution the components designated for the matrix or encapsulation are heated until a solution or melt is formed and then the previously crushed solid particles are mixed in.

It is advantageous to use high shear forces in this process.

The viscosity of the solution in which the solid particles are dispersed can be varied within a relatively wide range. For practical reasons it ranges between 0.5 to 200 mPa s measured at 90° C.

The viscosity depends to a large degree on the concentration and the DP of the cellulose used.

The molecular weight of the cellulose used also influences the dispersibility. A DP from 600 to 700 has proven particularly advantageous. In general it can be said that the lower the DP, the better the adsorption of the cellulose on the dispersed particles.

The quantities of the individual components of the composition and also the conditions of the process during its manufacture such as temperature, viscosity and the like can be varied within a relatively wide range and be adjusted to the respective application. An advantageous composition can be easily determined by means of simple pre-tests.

In general, it can be said that the composition contains the individual components in the following amounts: 0.5 to 10 percent cellulose by weight, 5 to 60 percent solid particles by weight and the balance up to 100% of a mixture of tertiary amine oxide, water and, if necessary, any additional components.

The temperature at which the solid particles are dispersed in the solution depends on one hand on the ratio of NMMO to water. For example the monohydrate of N-methylmorpholine-N-oxide has a melting point of approximately 72° C., so that a temperature a few degrees above this is sufficient for producing a dispersion. For practical reasons, work is carried out at temperatures between approx. 85 to 120° C. It is understood that the temperature should not be set so high that a decomposition of the components could take place. Preferably the process is conducted at temperatures which do not exceed 130° C.

With the process of invention very high concentrations of solid particles can be dispersed. It is possible to produce for example dispersions of at least 40 to 50% titanium dioxide. Once the particles are well dispersed in the liquid matrix, the mass is in general solidified such as by pouring it into a mold and cooling it. The molded piece can easily be crushed, e.g., by grinding.

The process of the invention uses for the production of the encapsulation or the matrix celluloses of various origins and with various degrees of polymerization such as cotton linters, cotton fibers, microcrystalline cellulose, and chemical wood pulp among others. The degrees of polymerization can easily lie between 150 and 7000. Higher or lower values are not excluded. It is also possible to use mixtures of differing degrees of polymerization.

The compositions obtained can easily be dispersed in cellulosic spin masses containing tertiary amine oxides, water and possibly additional additives. A very even distribution of the particles takes place very quickly. This is a particularly advantageous way of matting filaments, films and membranes with titanium dioxide. Also the production of filaments containing barium sulfate, which exhibit exceptional stability towards UV radiation, is very simple. The production of X-ray contrast fibers for medical purposes containing barium sulfate is also particularly advantageous.

The compositions of the invention can also be easily employed in the appropriate amounts even during the production of the spin mass. The composition can hereby be mixed with a mixture of NMMO/$H_2O$, fused, and the cellulose can then be added with the excess water being drawn off, if necessary.

Also the distribution of synthetic polymers can be carried out without problems. Spin masses can also be doped extremely well with the appropriate dispersions.

The liquid dispersion, however, can also be formed into discrete particles by means of spraying. The spraying can be carried out using common apparatus. The size of the particles can be controlled easily by varying the spray speed, the length of the spray distance as well as the conditions in the spray channel such as temperature and pressure.

The viscosity likewise plays a role so that it is possible to control the shape of the discrete particles by adjusting the viscosity, e.g., by varying the concentration or the DP of the cellulose employed. Also by means of other additives the form of the particles obtained during the spray process can be influenced. Thus, it is possible to produce discrete particles in powder form, with a spherical, granular, rod-like shape, etc.

It is also possible to directly process the liquid dispersion without first cooling it down, solidifying or crushing it.

The invention will be explained more in detail with reference to the following examples:

EXAMPLE 1

1073 g of an NMMO/water mixture (76% NMMO, 24% $H_2O$), 16 g cellulose (DP=625, 5% moisture content) and 1.5 g stabilizer (gallic acid propyl ester) are prepared in a container and heated to 90° C. This dispersion is stirred for approx. 15 minutes and 100 g water is then separated under vacuum. After the water has been separated, a clear cellulose solution is obtained.

745 g $TiO_2$ (Kronos 1072) are added in portions to the cellulosic solution by means of a dispersing apparatus (Getzmann Company, D 51580 Reichshof, Model Dispernat F1) and dispersed for approx. 30 minutes at a speed of 3000–6000 rpm.

Subsequent to the dispersion phase, the $TiO_2$ paste is cast in a mold where it is solidified. Such solid pastes can be easily redispersed by simply stirring in concentrated NMMO 75–90% at a temperature of 90–120° C.

EXAMPLE 2

554 g of an NMMO/water mixture (83% NMMO), 0.8 g stabilizer and 11.3 g cellulose are prepared in a container and heated to approx. 95° C. while being stirred simultaneously. After approx. 30 to 60 minutes a cellulosic solution is obtained. In this example it is no longer necessary to separate the water as in example 1.

The dispersing of $TiO_2$ is carried out as in example 1.

The degree of polymerization (DP) of cellulose was calculated in cupric ethylenediamine (Merck Company) by means of viscometric measurement of the intrinsic viscosity (ETA) according to the Staudinger equation:

$$|ETA|=K.DP^a$$

$$DP<950 \rightarrow K=0.42, a=1.0$$

$$DP>950 \rightarrow K=2.28, a=0.76$$

This method is described by Marianne Marx-Figini in "Die Angewandte Makromolekulare Chemie 72 (1978), 161–171", among others.

What is claimed is:

1. A composition containing solid particles held in an encapsulation or dispersed in a matrix, the solid particles being inert towards the encapsulation or the matrix and do not decompose the encapsulation or the matrix, whereby the encapsulation or the matrix comprises a homogeneous mixture of cellulose, tertiary amine oxide, water and optional additional components, and the composition comprises 0.5 to 10 percent cellulose by weight, 5 to 76 percent solid particles by weight and the balance up to 100% of a mixture of tertiary amine oxide, water and optional additional components.

2. The composition according to claim 1, wherein the tertiary amine oxide is N-methylmorpholine-N-oxide.

3. The composition according to claim 1, wherein the composition comprises 40 to 50 percent solid particles by weight, 1 to 2 percent cellulose by weight (in relation to the solid particles) and 59 to 48 percent by weight of a mixture of tertiary amine oxide and water.

4. The composition according to claim 1, wherein the cellulose exhibits a degree of polymerization of between 500 and 700.

5. The composition according to claim 1, wherein the tertiary amine oxide and water are present in a weight ratio of 75–90: 25–10.

6. The composition according to claim 1, wherein the solid particles are inorganic solid particles.

7. The composition according to claim 1, wherein the solid particles are organic solid particles.

8. The composition according to claim 7, wherein the organic solid particles are synthetic polymers.

9. The composition according to claim 6, wherein the inorganic solid particles are selected from the group consisting of titanium dioxide and barium sulfate.

10. The composition according to claim 1, wherein the composition is solid at room temperature.

11. The composition according to claim 1, wherein the composition is liquid.

12. The composition according to claim 1, wherein the composition exists as discrete formed particles.

13. The composition according to claim 12, wherein the formed particles are in powder form.

14. The composition according to claim 12, wherein the formed particles exhibit a spherical shape or a granular shape.

15. A process for the production of compositions containing solid particles held in an encapsulation or dispersed in a matrix, the solid particles being inert towards the encapsulation or the matrix and do not decompose the encapsulation or the matrix, the process comprising distributing the solid particles in a solution of cellulose, tertiary amine oxide, water and optional additional components, whereby the composition is produced with 0.5 to 10 percent cellulose by weight, 5 to 76 percent solid particles by weight and the balance up to 100% of a mixture comprising tertiary amine oxide, water and optional additional components.

16. The process according to claim 15, wherein the process further comprises cooling down and crushing the obtained dispersion.

17. The process according to claim 15, wherein the process further comprises draining off excess solution, followed by cooling down and crushing the obtained dispersion.

18. The process according to claim 15, wherein the solid particles are distributed using high shear forces.

19. The process according to claim 15, wherein the solid particles are distributed in a solution with a viscosity between 5 and 100 mPa s.

20. The process according to claim 15, wherein the dispersion, in liquid form, is cast in a mold, cooled down to obtain a mass, and the mass obtained is crushed.

21. The process according to claim 15, wherein the dispersion, in liquid form, is formed into discrete formed particles by spraying.

22. The process according to claim 15, wherein the process further comprises pigmenting cellulose filaments with the composition.

23. The process according to claim 15, wherein the process further comprises matting cellulose filaments with the composition.

24. The process according to claim 15, wherein the process further comprises forming cellulose filaments from the composition, which filaments remain stable when exposed to ultraviolet radiation.

25. The process according to claim 15, wherein the process further comprises forming X-ray contrast fibers from the composition.

26. The composition according to claim 1, wherein the solid particles being inert towards the encapsulation or the matrix and that do not decompose the encapsulation or the matrix exclude solid particles selected from the group consisting of copper oxide, ferric oxide and ferrous oxide.

* * * * *